(12) United States Patent
Chan et al.

(10) Patent No.: US 8,902,156 B2
(45) Date of Patent: Dec. 2, 2014

(54) INTELLIGENT REAL-TIME DISPLAY SELECTION IN A MULTI-DISPLAY COMPUTER SYSTEM

(75) Inventors: Yuk L. Chan, Poughkeepsie, NY (US); Dwifuzi Coe, Poughkeepsie, NY (US); Gilbert Y. Lee, Wappingers Falls, NY (US); Michael S. Wang, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 13/006,539

(22) Filed: Jan. 14, 2011

(65) Prior Publication Data

US 2012/0182210 A1 Jul. 19, 2012

(51) Int. Cl.
*G09G 5/00* (2006.01)
*G06F 3/14* (2006.01)
*G09G 5/14* (2006.01)
*G09G 5/12* (2006.01)

(52) U.S. Cl.
CPC ............. *G06F 3/1423* (2013.01); *G09G 5/14* (2013.01); *G09G 5/12* (2013.01)
USPC ............... 345/156; 345/1.1; 345/1.3; 345/7; 345/8

(58) Field of Classification Search
CPC ... G06F 3/1415; G06F 3/1423; G06F 3/1454; G09G 2340/0464; G09G 2370/042; G09G 2370/16
USPC ................ 345/1.1–1.3, 7–10, 156–174, 204, 345/541–543, 660; 715/729, 753, 751; 382/106, 113, 118, 154; 348/14.07, 46, 348/56

See application file for complete search history.

(56) References Cited

U.S. PATENT DOCUMENTS

| | | | |
|---|---|---|---|
| 5,446,834 A | 8/1995 | Deering | |
| 6,112,445 A | 9/2000 | Feeney | |
| 6,573,888 B2 * | 6/2003 | Hayashi et al. | 345/204 |
| 6,844,865 B2 | 1/2005 | Stasko | |
| 6,967,632 B1 | 11/2005 | Minami et al. | |
| 7,195,355 B2 | 3/2007 | Nashner | |
| 7,477,892 B2 * | 1/2009 | Coward et al. | 455/414.1 |
| 7,557,824 B2 | 7/2009 | Holliman | |
| 7,567,233 B2 * | 7/2009 | Garibaldi et al. | 345/157 |
| 2004/0032393 A1 * | 2/2004 | Brandenberg et al. | 345/156 |
| 2005/0195373 A1 * | 9/2005 | Feigel et al. | 353/94 |
| 2005/0259032 A1 * | 11/2005 | Morris | 345/1.1 |
| 2006/0119572 A1 * | 6/2006 | Lanier | 345/156 |

(Continued)

OTHER PUBLICATIONS

Raskar, R. et al., "Multi-Projector Displays Using Camera-Based Registration," Proceedings Visualization •99, Oct. 24-29, 1999, 8 pages.

(Continued)

*Primary Examiner* — Prabodh M Dharia
(74) *Attorney, Agent, or Firm* — Cantor Colburn LLP; William A. Kinnaman, Jr.

(57) ABSTRACT

A system and computer-implemented method for managing a plurality of display devices in a multi-display computer system that includes determining in real-time input information including face direction of a user facing the plurality of display devices, selecting a primary display device of the plurality of display devices using the input information determined, and transferring information to the primary display device as desired by the user.

18 Claims, 3 Drawing Sheets

(56) References Cited

U.S. PATENT DOCUMENTS

| | | |
|---|---|---|
| 2007/0136134 A1 | 6/2007 | Moscovitch |
| 2007/0268394 A1* | 11/2007 | Nonaka et al. ............ 348/333.12 |
| 2008/0068285 A1* | 3/2008 | Kondo et al. ................... 345/1.1 |
| 2009/0083589 A1* | 3/2009 | Fulton et al. ..................... 714/48 |
| 2009/0085831 A1 | 4/2009 | Odoi et al. |
| 2009/0085921 A1* | 4/2009 | Do et al. ......................... 345/543 |
| 2009/0115788 A1* | 5/2009 | Black et al. .................... 345/520 |
| 2010/0036548 A1* | 2/2010 | Nichols et al. ..................... 701/4 |
| 2010/0205541 A1* | 8/2010 | Rapaport et al. .............. 715/753 |
| 2011/0037711 A1* | 2/2011 | Siddiqui et al. ............... 345/173 |
| 2011/0084900 A1* | 4/2011 | Jacobsen et al. .............. 345/156 |
| 2011/0310001 A1* | 12/2011 | Madau et al. ................. 345/156 |
| 2012/0038550 A1* | 2/2012 | Lemmey et al. .............. 345/156 |
| 2012/0188185 A1* | 7/2012 | Cassar .......................... 345/173 |
| 2013/0076657 A1* | 3/2013 | Reeves et al. ................. 345/173 |

OTHER PUBLICATIONS

L. Morency, et al., "Fast Stereo-Based Head Tracking for Interactive Environments," In Proceedings of the Intl. Conference on Automatic Face and Gesture Recognition, May 21, 2002, pp. 1-6.

* cited by examiner

INTELLIGENT REAL-TIME DISPLAY SELECTION IN A MULTI-DISPLAY COMPUTER SYSTEM

BACKGROUND

The present invention relates to a multi-display computer system. More particularly, the present invention relates to a multi-display computer system and method for managing a plurality of display devices of the system.

Multi-display computer systems are being used more often today since they enable users to view different applications and documents, simultaneously. However, in the multi-display computer environment, it may be difficult for a user to manage the plurality of display devices because the operating system is not capable of tracking which display device of the plurality of display devices the user is focusing on at a given time. Typically, the operating system uses historical information and predefined configuration to determine which display device is the primary display device for displaying information on such as notifications, newly opened applications, primary desktop controls (e.g., taskbar, desktop icons), input device control (e.g., mouse cursor) or user input actions (e.g., the minimizing and maximizing of a window application). Therefore, typically, one of the display devices is considered the primary display and a user has to click and drag an application to another display device when desired and return to the primary display device to open any new applications or receive new notifications, etc.

It is desirable to have a multi-display computer system that enables a user to better manage use of the plurality of display devices within the system.

SUMMARY

According to one embodiment of the present invention, a computer-implemented method for managing a plurality of display devices in a multi-display computer system is provided. The method includes determining in real-time input information including face direction of a user facing the plurality of display devices, and selecting a primary display device of the plurality of display devices using the input information determined.

According to other embodiments of the present invention, a computer system and computer-program product capable of performing the above-mentioned method are provided.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
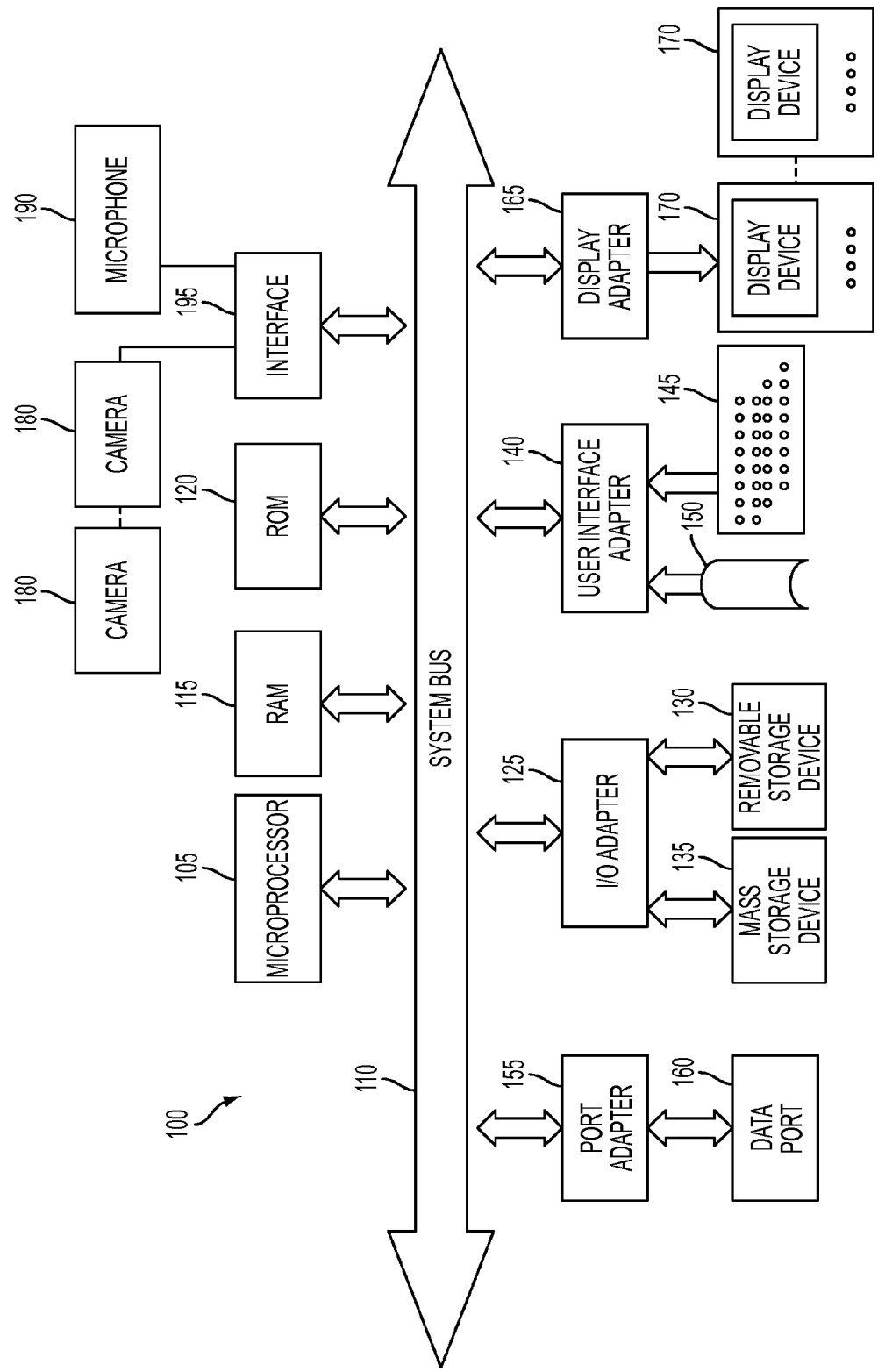
FIG. 1 is a diagram illustrating an example of a multi-display computer system that may be used to implement embodiments of the present invention.

FIG. 1 is a schematic block diagram of a general-purpose computer suitable for practicing the present invention embodiments. The present invention is not limited to use of a general purpose computer and may be implemented in other computer environment where multiple displays are necessary, for example, in airline control panel systems. For purposes of example only, in FIG. 1, a multi-display computer system 100 is provided. The multi-display computer system 100 has at least one microprocessor or central processing unit (CPU) 105. CPU 105 is interconnected via a system bus 110 to a random access memory (RAM) 115, a read-only memory (ROM) 120, an input/output (I/O) adapter 125 for a connecting a removable data and/or program storage device 130 and a mass data and/or program storage device 135, a user interface adapter 140 for connecting a keyboard 145 and a mouse 150 to enable a user to input information, a port adapter 155 for connecting a data port 160 and a display adapter 165 for connecting a plurality of display devices 170.

ROM 120 contains the basic operating system for the multi-display computer system 100. The operating system may alternatively reside in RAM 115 or elsewhere as is known in the art. Examples of removable data and/or program storage device 130 include magnetic media such as floppy drives and tape drives and optical media such as CD ROM drives. Examples of mass data and/or program storage device 130 include hard disk drives and non-volatile memory such as flash memory. In addition to keyboard 145 and mouse 150, other user input devices such as trackballs, writing tablets, pressure pads, light pens and position-sensing screen displays may be connected to user interface 140. Examples of display devices include cathode-ray tubes (CRTs) and liquid crystal displays (LCDs). For the purposes of the present invention, a plurality of camera devices 180 may be included as input devices to the multi-display computer system 100. The camera devices 180 may be built-in the display devices 170 of the computer system 100 or external devices connected to the computer system 100 through an interface 195 to the system bus 110 as shown in FIG. 1. The camera devices 180 each may be a digital electronic still or video camera capable of capturing a plurality of images. These images may be routed to and stored in the RAM 115. A microphone 190 may also be included in the computer system 100.

Figure 2:
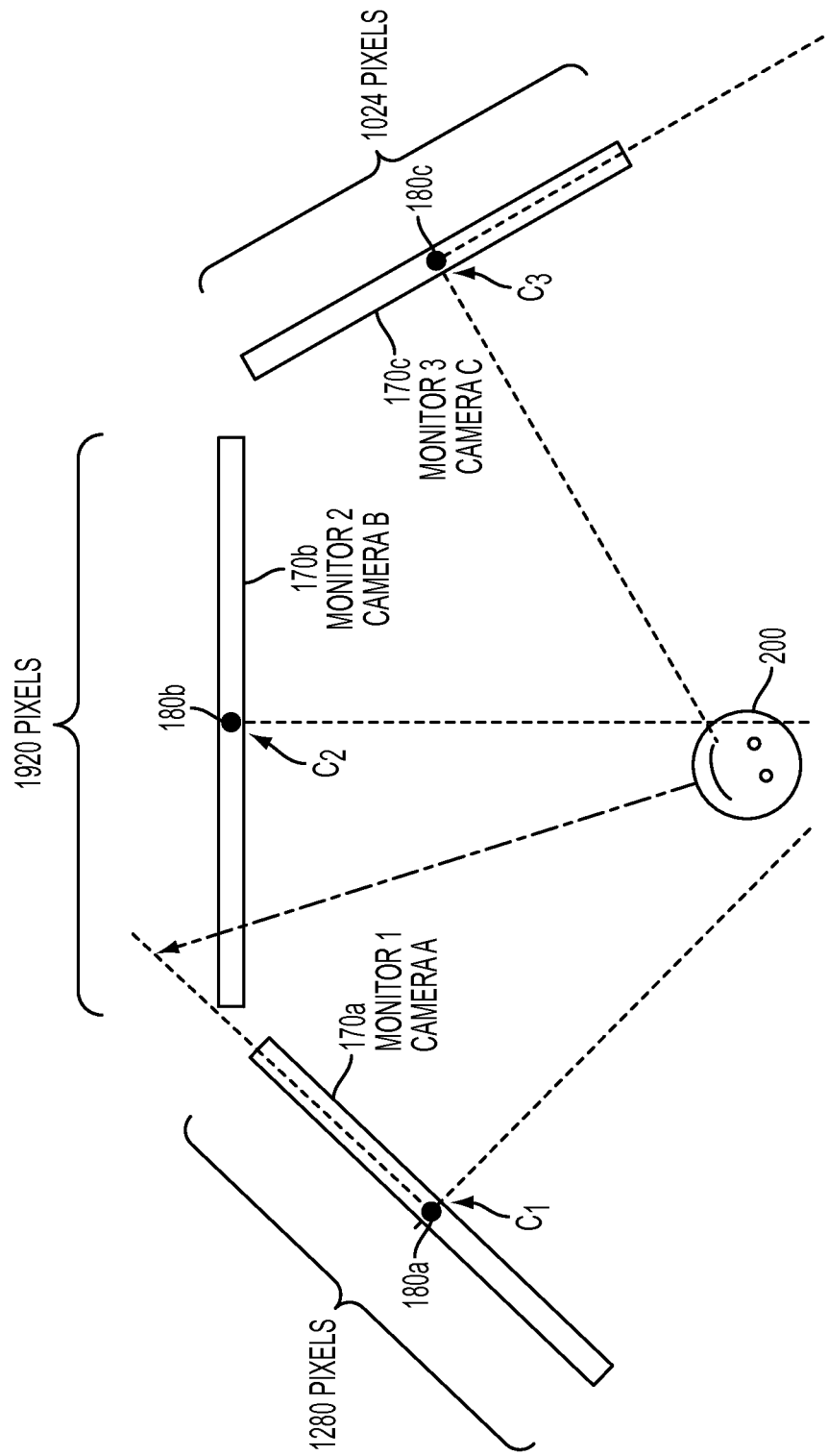
FIG. 2 is a diagram illustrating a multi-display environment that can be implemented within embodiments of the present invention.

A computer program with an appropriate application interface may be created and stored on the system 100 or a data and/or program storage device to perform the method according to embodiments of the present invention as discussed below with reference to FIGS. 2 and 3. In operation, information for or the computer program created to run the present invention is loaded on the appropriate removable data and/or program storage device 130, fed through data port 160 or typed in using keyboard 145.

Additional details regarding the system and method for managing a plurality of display devices in a multi-display computer system will now be discussed below with reference to FIGS. 2 and 3. As shown in FIG. 2, a plurality of display devices 170a, 170b and 170c are provided. According to an embodiment of the present invention, the display devices 170a, 170b and 170c may be at least one of computer monitors, projectors, or televisions. According to an embodiment of the present invention, a user 200 is positioned a predetermined distance from the display devices 170a, 170b and 170c. For example, the predetermined distance may range from approximately 15 to 25 inches. Further, the user is positioned approximately a same distance from each of the display devices 170a, 170b and 170c. A plurality of camera devices 180a, 180b and 180c are provided. Each camera device 180a, 180b and 180c corresponds to a particular display device 170a, 170b or 170c of the plurality of display devices 170a, 170b and 170c. The present invention is not limited to a particular number of display devices or camera devices, and may vary as needed. According to another embodiment of the present invention, the present invention may be implemented using only a single camera device. For example, according to an embodiment of the present invention a single 3D stereo camera may be used to detect face direction.

Further, according to embodiments of the present invention, face direction may be determined with or without the use of camera devices 180a, 180b or 180c and instead based upon existing face direction technology.

Figure 3:
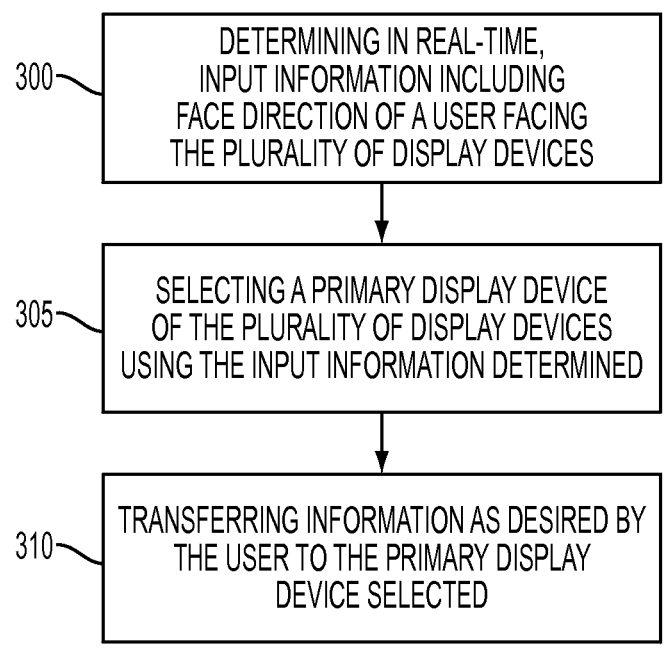
FIG. 3 is a flow diagram illustrating a computer-implemented method for managing the use of multiple displays within a multi-display computer system that can be implemented within embodiments of the present invention.

In FIG. 3, at operation 300, input information including face direction of a user facing the plurality of display devices is determined in real-time. According to one embodiment of the present invention, the camera devices 180a, 180b and 180c may detect the face direction simultaneously.

Embodiments of the present invention disclose the use of face recognition technology and/or head movement technology to determine the input information. Face recognition technology uses visible physical structure of an individual's face for recognition purposes. Head movement technology includes determining a direction in which the user is moving his/her head. At any given time, a user's vision can only focus on a single subject. The natural tendency of the user 200 in a multi-display computer environment is to turn toward a display device 170a, 170b or 170c on which the user 200 intends to perform an action. Therefore, according to an embodiment of the present invention, this human behavior is used as input data for display selection.

In FIG. 3, at operation 300, the input information is determined based on pixel information of the plurality of display devices 170a, 170b and 170c. Referring back to FIG. 2, each display device 170a, 170b and 170c is formed of a particular number of pixels along its horizontal dimension, or x-axis. Display device 170a is formed of 1280 pixels; display device 170b is formed of 1920 pixels; and display device 170c is formed of 1024 pixels. According to an embodiment of the present invention, each display device 170a, 170b and 170c may be formed of the same or different number of pixels. According to an embodiment of the present invention, the number of pixels of each display device 170a, 170b and 170c is used to determine a center point $c_1$, $c_2$ and $c_3$ corresponding to the vertical midline of the display area of each display device 170a, 170b and 170c and a fixed maximum resolution range along an x-axis of each display device 170a, 170b, and 170c, in order to detect a face direction of the user 200. According to an embodiment of the present invention, each corresponding camera device 180a, 180b and 180c is disposed at the center point $c_1$, $c_2$ and $c_3$ of each respective display device 170a, 170b and 170c. Since the display device 170a is formed of 1280 pixels, the fixed maximum resolution range is −640 to 640 pixels; similarly, since respective display devices 170b and 170c are formed of 1920 pixels and 1024 pixels, the fixed maximum resolution range of display device 170b is −960 to 960 pixels and the fixed maximum resolution range of the display device 170c is −512 to 512 pixels.

Next, each camera device 180a, 180b and 180c determines a pixel coordinate corresponding to the input information (e.g., the face direction of the user 200). For a particular display device, this pixel coordinate corresponds to the intersection of the plane of the display (indicated for display devices 170a and 170c by broken lines in FIG. 2) and a straight-ahead line of sight (indicated by the dot-dash line in FIG. 2) corresponding to the face direction of the user 200. The pixel coordinate determined by each camera device 180a, 180b and 180c is then compared to the fixed maximum resolution range of a corresponding display device 170a, 170b and 170c of each camera device 180a, 180b and 180c. For example, as shown in FIG. 2, the camera device 180a corresponding to the display device 170a detects that the face direction of the user 200 is at a pixel coordinate of approximately +780 pixels from a center point of the display device 170a, which is out of the fixed maximum resolution range (−640 to 640 pixels) for the display device 170a. Also, camera device 180c detects that the face direction of the user 200 is unknown. That is, the face direction of the user 200 is out of range for detection by the camera device 180c. Further, the camera device 180b detects that the face direction of the user 200 is at a pixel coordinate of approximately −800 pixels, which is within the fixed maximum range (−960 to 960 pixels) of the camera device 170b.

Referring back to FIG. 3, from operation 300, the process continues to operation 305 where a primary display device of the plurality of display devices 170a, 170b or 170c is selected using the input information determined. Thus, in this embodiment of the present invention, the computer system 100 may select the corresponding display device as the primary display device, when the pixel coordinate is within the maximum resolution range of the corresponding display device. That is, in the above-mentioned example, the computer system 100 determines that the user 200 is facing the display device 170b; therefore it is determined that display device 170b is the primary display device. From operation 305, the process continues to operation 310 where the system 100 will notify the operating system (OS) and the OS will capture and transfer information to the selected primary display device as desired by the user. The information may include event information such as all the desktop icons, taskbar and the mouse 150 cursor moves to the selected primary display device. As a result, the multi-display computer system 100 is able to determine which display device 170a, 170b or 170c, the user 200 is facing at a given time. If more than one camera device 180a, 180b or 180c detects that the pixel coordinate is within its fixed maximum resolution range then the system 100 will not change the primary display selection, instead the system 100 will determine that there is a configuration error of overlapping of the display devices 170a, 170b and 170c.

Alternatively, other methods of detecting face direction may be implemented within embodiments of the present invention. For example, at operation 300, the use of cumulative match scores (CMS) may be used to determine the face direction of the user 200. For example, each camera device 180a, 180b and 180c may determine a CMS and the CMS of each camera device 180a, 180b and 180c will be compared and the display device 170a, 170b or 170c having the camera device 180a, 180b or 180c with the highest CMS will be selected as the primary display device.

According to an embodiment of the present invention, at operation 305, the use of face recognition technology and/or the user's head movement may be used independently, asynchronously or in combination with the other input devices (e.g., the keyboard 145 and/or the mouse 150, user controller or any other sensing device) in order to detect which display device 170a, 170b or 170c the user 200 is focused on at a given time. According to one embodiment of the present invention, if face direction is used independently as input data into the computer system 100, once the face direction of the user 200 has been detected, the computer system 100 automatically selects the display device 170a, 170b or 170c as the "primary" display device. That is, according to this embodiment of the present invention, the primary display device is automatically selected based on the input information.

If the primary display device is selected by using the input information and the other input device in combination, the other input device (e.g., the mouse 150 or keyboard 145) may be used to select an application to be moved from one display device 170a, 170b or 170c of the plurality of display devices 170a, 170b and 170c to another display device 170a, 170b or 170c of the plurality of display devices 170a, 170b and 170c. Then, after selecting the application via the other input device, the input information (e.g., head movement/face direction) is determined and the application is moved to the other display device 170a, 170b or 170c using the input information. For example, to click and drag a window application, the user 200 may click and hold the title bar of the window application and as the user 200 turns his/her head to another display device 170a, 170b or 170c, the window application may move to the desired display device 170a, 170b or 170c.

Embodiments of the present invention provide a system and method for managing multiple displays in a multi-display computer system by detecting a face direction of the user. The advantages associated with the present invention include allowing the user to better manage each display in a multi-display environment, even if they are not connected (e.g., continuous), displays that are placed in an angle and toleration of natural head movement within a predetermined degree of error that is magnified by factors such as lighting conditions, etc.

In view of the above, the present method embodiment may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for managing a plurality of display devices in a multi-display computer system, the method comprising:
    determining, in real-time, input information including face direction of a user facing the plurality of display devices, using at least one camera device in operable communication with the plurality of display devices;
    selecting a primary display device of the plurality of display devices using the input information determined;
    transferring information to the primary display device selected as desired by the user;
    determining the input information by determining a cumulative match score of each of the plurality of display devices via the at least one camera device;
    comparing the cumulative match scores and determining which cumulative match score is a highest score of the cumulative match scores; and
    selecting a display device having the highest score as the primary display device.

2. The computer-implemented method of claim 1, wherein the face direction is determined using at least one of facial recognition technology or head movement technology.

3. The computer-implemented method of claim 1, wherein the primary display device is automatically selected based on the input information.

4. The computer-implemented method of claim 1, further comprising:
    selecting the primary display device using the input information and another input device asynchronously or in combination, wherein the other input device comprises at least one of a mouse, a keyboard, a user controller or other sensing device.

5. The computer-implemented method of claim 4, wherein selecting a primary display device by using the input information and the other input device asynchronously comprises:
- detecting in real-time an estimated location using the input information; and
- selecting the primary display device using the other input device.

6. The computer-implemented method of claim 4, wherein selecting a primary display device by using the input information and the other input device in combination comprises:
- selecting, via the other input device, an application to be moved from one display device of the plurality of display devices to another display device of the plurality of display devices; and
- determining the input information after selecting the application, and moving the application to the other display device of the plurality of display devices using the input information determined.

7. A multi-display computer system having a plurality of display devices capable of allowing a user to manage the plurality of display devices, the system comprising:
- a computer device comprising at least one camera device including a program module to determine face direction; and
- a computer program comprising program modules executable by the computer device, wherein the computer device is directed by the program modules of the computer program to:
  - determine, in real-time, input information including face direction of a user facing the plurality of display devices;
  - select a primary display device of the plurality of display devices using the input information determined;
  - transfer information to the primary display device selected as desired by the user;
  - determine the input information by determining a cumulative match score of each of the plurality of display devices via the at least one camera device;
  - compare the cumulative match scores and determining which cumulative match score is a highest score of the cumulative match scores; and
  - select a display device having the highest score as the primary display device.

8. The computer system of claim 7, wherein the face direction is determined using at least one of facial recognition or head movement technology.

9. The computer system of claim 7, wherein the primary display device is automatically selected based on the input information.

10. The computer system of claim 7, wherein the computer system is directed by the program modules of the computer program to:
- select the primary display device using the input information and another input device asynchronously or in combination, wherein the other input device comprises at least one of a mouse, a keyboard, a user controller or other sensing device.

11. The computer system of claim 10, wherein the program module to select a primary display device by using the input information and the other input device asynchronously, comprises modules to:
- detect in real-time an estimated location using the input information; and
- select the primary display device using the other input device.

12. The computer system of claim 10, wherein the program module to select a primary display device by using the input information and the other input device in combination, comprises modules to:
- select via the other input device an application to be moved from one display device of the plurality of display devices to another display device of the plurality of display devices; and
- determine the input information after selecting the application, and moving the application to the other display device of the plurality of display devices using the input information determined.

13. A computer-program product comprising a computer useable medium including a computer readable program, wherein the computer readable program when executed on a multi-display computer system causes the multi-display computer system to implement method for managing a plurality of display devices in the multi-display computer system, the method comprising:
- determining, in real-time, input information including face direction of a user facing the plurality of display devices, using at least one camera device in operable communication with the plurality of display devices;
- selecting a primary display device of the plurality of display devices using the input information determined; and
- transferring information to the primary display device selected as desired by the user;
- determining the input information by determining a cumulative match score of each of the plurality of display devices via the at least one camera device; and
- comparing the cumulative match scores and determining which cumulative match score is a highest score of the cumulative match scores; and
- selecting a display device having the highest score as the primary display device.

14. The computer-program product of claim 13, wherein the face direction is determined using at least one of facial recognition technology or head movement technology.

15. The computer-program product of claim 13, wherein the primary display device is automatically selected based on the input information.

16. The computer-program product of claim 13, wherein the method further comprises:
- selecting the primary display device using the input information and another input device asynchronously or in combination, wherein the other input device comprises at least one of a mouse, a keyboard, a user controller or other sensing device.

17. The computer-program product of claim 13, wherein selecting a primary display device by using the input information and the other input device asynchronously comprises:
- detecting in real-time an estimated location using the input information; and
- selecting the primary display device using the other input device.

18. The computer-program product of claim 13, wherein selecting a primary display device by using the input information and the other input device in combination comprises:
- selecting, via the other input device, an application to be moved from one display device of the plurality of display devices to another display device of the plurality of display devices; and
- determining the input information after selecting the application, and moving the application to the other display device of the plurality of display devices using the input information determined.

* * * * *